(12) United States Patent
Yeung et al.

(10) Patent No.: US 10,486,102 B2
(45) Date of Patent: Nov. 26, 2019

(54) MATERIALS FOR MOISTURE REMOVAL AND WATER HARVESTING FROM AIR

(71) Applicant: The Hong Kong University of Science and Technology, Kowloon (HK)

(72) Inventors: King Lun Yeung, China (HK); Shammi Akter Ferdousi, China (HK)

(73) Assignee: The Hong Kong University of Science and Technology, Kowloon (HK)

( * ) Notice: Subject to any disclaimer, the term of this patent is extended or adjusted under 35 U.S.C. 154(b) by 146 days.

(21) Appl. No.: 15/518,724

(22) PCT Filed: Oct. 14, 2015

(86) PCT No.: PCT/CN2015/091898
§ 371 (c)(1),
(2) Date: Apr. 12, 2017

(87) PCT Pub. No.: WO2016/058525
PCT Pub. Date: Apr. 21, 2016

(65) Prior Publication Data
US 2017/0232383 A1 Aug. 17, 2017

Related U.S. Application Data

(60) Provisional application No. 62/122,327, filed on Oct. 17, 2014.

(51) Int. Cl.
*B01D 53/02* (2006.01)
*B01D 53/26* (2006.01)
(Continued)

(52) U.S. Cl.
CPC .......... *B01D 53/261* (2013.01); *B01D 53/04* (2013.01); *B01D 53/26* (2013.01); *B01D 53/265* (2013.01);
(Continued)

(58) Field of Classification Search
CPC .......... B01D 2251/30; B01D 2253/106; B01D 2253/308; B01D 53/04; B01D 53/26;
(Continued)

(56) References Cited

U.S. PATENT DOCUMENTS 4,874,525 A * 10/1989 Markovs ................ B01D 15/00
210/673
4,892,567 A * 1/1990 Yan ........................ B01D 53/02
210/688
(Continued)

FOREIGN PATENT DOCUMENTS

CN          1785498 A      6/2006
CN        102284270 A     12/2011
(Continued)

OTHER PUBLICATIONS

International Search Report issued in corresponding application No. PCT/CN2015/091898 dated Jan. 11, 2016 (2 pages).
(Continued)

*Primary Examiner* — Christopher P Jones
(74) *Attorney, Agent, or Firm* — Osha Liang LLP

(57) ABSTRACT

A material for moisture removal and/or water harvesting from air may include a hydrophilic material containing micropores and a low water activity material confined within the micropores of the hydrophilic material. Apparatuses containing such materials and methods for moisture removal and/or water harvesting from air by using such materials are also described.

20 Claims, 20 Drawing Sheets

(51) Int. Cl.

| | |
|---|---|
| *B01J 20/22* | (2006.01) |
| *B01J 20/06* | (2006.01) |
| *B01J 20/28* | (2006.01) |
| *B01J 20/02* | (2006.01) |
| *B01J 20/10* | (2006.01) |
| *E03B 3/28* | (2006.01) |
| *B01D 53/04* | (2006.01) |
| *B01J 20/30* | (2006.01) |
| *B01J 20/32* | (2006.01) |
| *F24F 3/14* | (2006.01) |

(52) U.S. Cl.
CPC ....... *B01J 20/0214* (2013.01); *B01J 20/0225* (2013.01); *B01J 20/0233* (2013.01); *B01J 20/0237* (2013.01); *B01J 20/0244* (2013.01); *B01J 20/0251* (2013.01); *B01J 20/0255* (2013.01); *B01J 20/0281* (2013.01); *B01J 20/0288* (2013.01); *B01J 20/0296* (2013.01); *B01J 20/06* (2013.01); *B01J 20/103* (2013.01); *B01J 20/22* (2013.01); *B01J 20/28007* (2013.01); *B01J 20/2808* (2013.01); *B01J 20/28047* (2013.01); *B01J 20/3078* (2013.01); *B01J 20/3204* (2013.01); *B01J 20/3236* (2013.01); *E03B 3/28* (2013.01); *B01D 2251/30* (2013.01); *B01D 2253/106* (2013.01); *B01D 2253/308* (2013.01); *F24F 3/1411* (2013.01); *F24F 2003/1446* (2013.01); *Y02A 20/109* (2018.01)

(58) Field of Classification Search
CPC .. B01D 53/261; B01D 53/265; B01J 20/0214; B01J 20/0225; B01J 20/0233; B01J 20/0237; B01J 20/0244; B01J 20/0251; B01J 20/0255; B01J 20/0281; B01J 20/0288; B01J 20/0296; B01J 20/06; B01J 20/103; B01J 20/22; B01J 20/28007; B01J 20/28047; B01J 20/2808; B01J 20/3078; B01J 20/3204; B01J 20/3236; E03B 3/28; F24F 2003/1446; F24F 3/1411; Y02A 20/109
See application file for complete search history.

(56) References Cited

U.S. PATENT DOCUMENTS

| | | | | | |
|---|---|---|---|---|---|
| 5,240,472 | A * | 8/1993 | Sircar | ................ | B01D 53/229 95/120 |
| 5,415,907 | A * | 5/1995 | Inoue | ........................ | B32B 5/26 428/36.2 |
| 5,650,030 | A * | 7/1997 | Kyricos | ............... | B01D 53/261 156/192 |
| 5,709,736 | A * | 1/1998 | Fujimura | ............... | B01D 53/06 55/400 |
| 5,779,767 | A * | 7/1998 | Golden | ............. | B01D 53/0462 95/106 |
| 5,910,292 | A * | 6/1999 | Alvarez, Jr. | ........... | B01D 53/02 423/210 |
| 6,106,593 | A * | 8/2000 | Golden | .............. | B01D 53/0462 95/120 |
| 6,491,740 | B1 * | 12/2002 | Wang | ..................... | B01D 53/02 502/400 |
| 6,638,340 | B1 * | 10/2003 | Kanazirev | ............. | B01D 53/02 95/106 |
| 8,551,230 | B2 * | 10/2013 | Caggiano | ............. | B01D 53/002 95/113 |
| 2003/0089231 | A1 * | 5/2003 | Fujii | ..................... | B01D 46/12 95/117 |
| 2008/0061007 | A1 * | 3/2008 | Abadie | ..................... | G21F 5/06 210/763 |
| 2009/0071334 | A1 * | 3/2009 | Ryu | ..................... | B01D 53/228 95/117 |
| 2012/0034548 | A1 * | 2/2012 | Okuyama | ........... | H01M 4/8605 429/480 |
| 2012/0097029 | A1 * | 4/2012 | Hodgson | ............. | B01D 53/261 95/91 |
| 2012/0201730 | A1 * | 8/2012 | Pahwa | .............. | B01J 20/28071 423/210 |
| 2013/0319022 | A1 * | 12/2013 | Becze | .................. | B01D 53/263 62/94 |
| 2015/0343417 | A1 * | 12/2015 | Puranik | ................. | B01J 20/186 210/660 |
| 2016/0008753 | A1 * | 1/2016 | Corcoran, Jr. | ............ | C07C 2/76 95/96 |
| 2018/0161723 | A1 * | 6/2018 | Kodo | ..................... | B65D 81/26 |

FOREIGN PATENT DOCUMENTS

| | | |
|---|---|---|
| CN | 102686300 A | 9/2012 |
| CN | 103071453 A | 5/2013 |
| SU | 1526813 A1 | 12/1989 |

OTHER PUBLICATIONS

Written Opinion of the International Searching Authority issued in corresponding application No. PCT/CN2015/091898 dated Jan. 11, 2016 (5 pages).

* cited by examiner

MATERIALS FOR MOISTURE REMOVAL AND WATER HARVESTING FROM AIR

CROSS-REFERENCE TO RELATED APPLICATIONS

The present application is a U.S. national stage entry under 35 U.S.C. § 371 of International Application No, PCT/CN2015/091898 filed on Oct. 14, 2015, which claims priority to U.S. Patent Application No. 62/122,327 filed on Oct. 17, 2014, the whole content of all these applications being herein incorporated by reference for all purposes.

BACKGROUND

Water scarcity has an adverse impact on the global production of food, timber and fuel wood, as well as on the terrestrial sequestration of carbon in plants. The situation is expected to worsen as global climate change disturbs the precipitation pattern around the world. Water shortage and scarcity are therefore a priority issue of major global concern. However, water vapor present in air may represent an abundant source of clean drinking water if it could be harvested efficiently and inexpensively.

Fog is common in many coastal, high-altitude and forested regions of the world and therefore forms an important source of freshwater. For example, water is harvested from fog along the Pacific coast of South America, the Atlantic coast of North Africa and the coast of Cape of Good Hope in South Africa. Simple mesh nets are used to collect condensed water droplets from fog, and 5 to 20 L/m$^2$/day of water collected has been reported depending on the net material and design, location and prevailing environmental conditions. Such a technology is inexpensive as it requires little or no maintenance.

Moisture collection and droplet flow may also be performed by means of bio-materials inspired from nature, using mechanisms that mimic the ones used by plants, animals and insects that live in arid and semi-arid regions and therefore, are adapted for water scarcity. For example, a spider web is unique in its ability to collect moisture and accumulate water into large droplets, thus preventing losses from wind and heat. It has been speculated that this is due to the presence of hydrophilic and hydrophobic domains along the silk strand.

In addition to the water harvesting from fog or air, another source of water is the water present in the air as humidity which can be removed by using air conditioning or air dehumidifier systems.

Humidity plays a key role in our perception of thermal comfort. Controlling the humidity level is also important in suppressing microbial growth indoor such as mildews, molds and rots that may damage building structures and generate unwanted bioaerosols (i.e., spores) and toxic microbial emissions that can trigger asthma and allergy, causing respiratory distress and even toxic shock and death in severe cases. More than a third of the electricity used in space conditioning is wasted in cooling water moisture that has large latent and sensible heats compared to air. Indeed, the energy required to lower the humidity level of 1 kg of air from 75 percent relative humidity (RH) to the comfort level of 60 percent RH at a fixed temperature of 25° C. is 9 times more than the energy needed to cool 1 kg of dry air by 1° C. Therefore, a significant energy saving with the concomitant reduction in greenhouse gas emission can be achieved if moisture could be removed from air prior to cooling. However, current refrigeration-cycle and adsorbent-based dehumidification technologies are energy intensive. Therefore, there exists a continuing need for designing materials, methods and systems for moisture removal and/or water harvesting from air.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a material for moisture removal and/or water harvesting from air that includes a hydrophilic material containing micropores and a low water activity material confined within the micropores of the hydrophilic material.

In another aspect, embodiments of the present disclosure relate to a method for moisture removal and/or water harvesting from air that includes providing a material for moisture removal and/or water harvesting from air and collecting water from the material.

In yet another aspect, embodiments disclosed herein relate to an apparatus that includes a material for moisture removal and/or water harvesting from air and at least a container or a drainage system for collecting water from the material.

Other aspects and advantages of the claimed subject matter will be apparent from the following description and the appended claims.

DETAILED DESCRIPTION

Generally, embodiments disclosed herein relate to materials used for moisture removal and/or water harvesting and methods of preparing the same. More specifically, embodiments disclosed herein relate to materials for moisture removal and/or water harvesting from air that include a low water activity (LWA) material confined within the narrow pores (such as micropores) of a hydrophilic material. The inventors of the present disclosure have found that confining LWA materials within the narrow pores of a hydrophilic material may have a synergistic effect on moisture removal and/or water harvesting by promoting vapor condensation, droplet formation and water flow. Thus, such materials may be used for both indoor air dehumidification and outdoor water harvesting, or any other application in which water is collected from the air.

The materials for moisture removal and/or water harvesting from air of the present disclosure incorporate a low water activity material which may be confined within the micropores of a hydrophilic material. According to the present embodiments, the LWA materials may be incorporated in the hydrophilic material in an amount that ranges from 0.1 wt % to 80 wt %.

Figure 1:
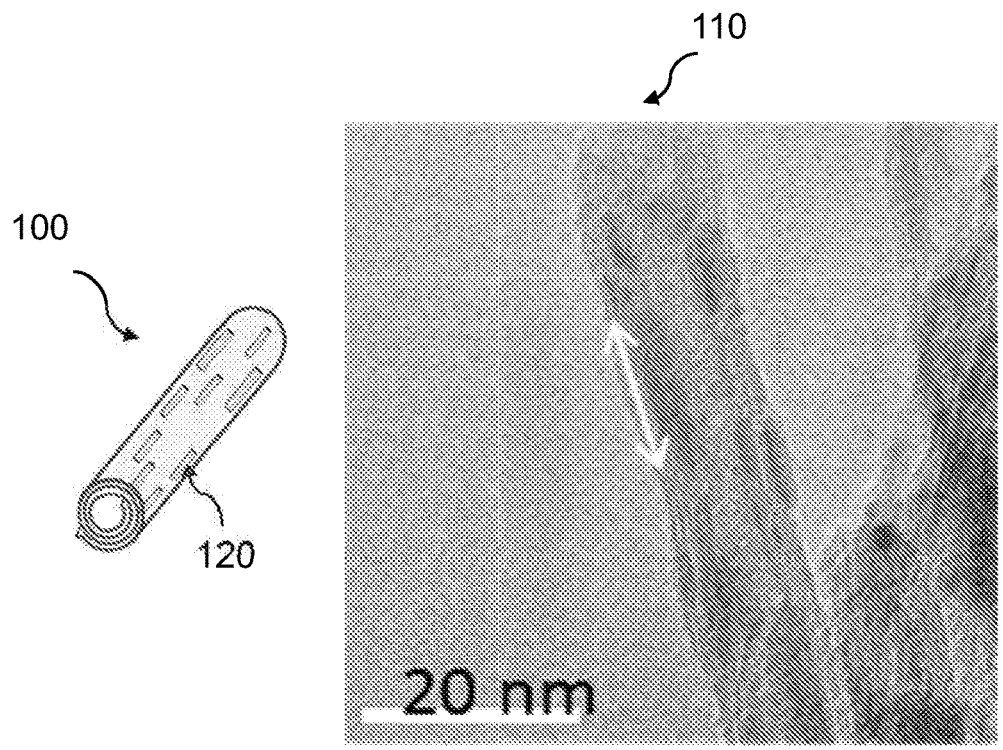
FIG. 1 shows a high magnification Transmission Electron Microscopy (TEM) image of a confined low activity water material according to embodiments of the present disclosure.
Figure 2:
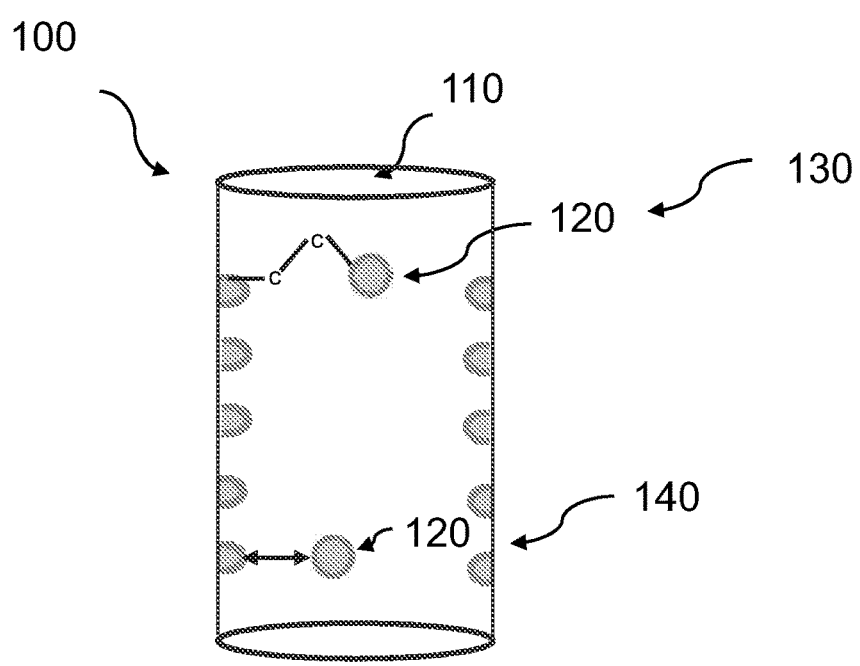
FIG. 2 depicts a schematic drawing of the confinement mechanism according to embodiments of the present disclosure.

Referring now to FIG. 1, FIG. 1 shows an embodiment of the present disclosure. As shown, a material 100 of the present disclosure includes a low water activity material 120 confined within a nanotube 110. Several approaches may be used to confine low water activity materials within the narrow micropores of a hydrophilic material. For example, such methods may include, but they are not limited to, liquid deposition, vapor deposition, solid phase reaction, impregnation, ion-exchange, covalent bonding, electrostatic immobilization, sol-gel method, reactive deposition and incorporation. Referring now to FIG. 2, FIG. 2 shows two possible mechanisms of confinement, namely covalent bonding 130 and electrostatic immobilization 140 of low water activity material 120 on the inner wall of the pores of nanotubes 110 or other hydrophilic materials.

Figure 3:
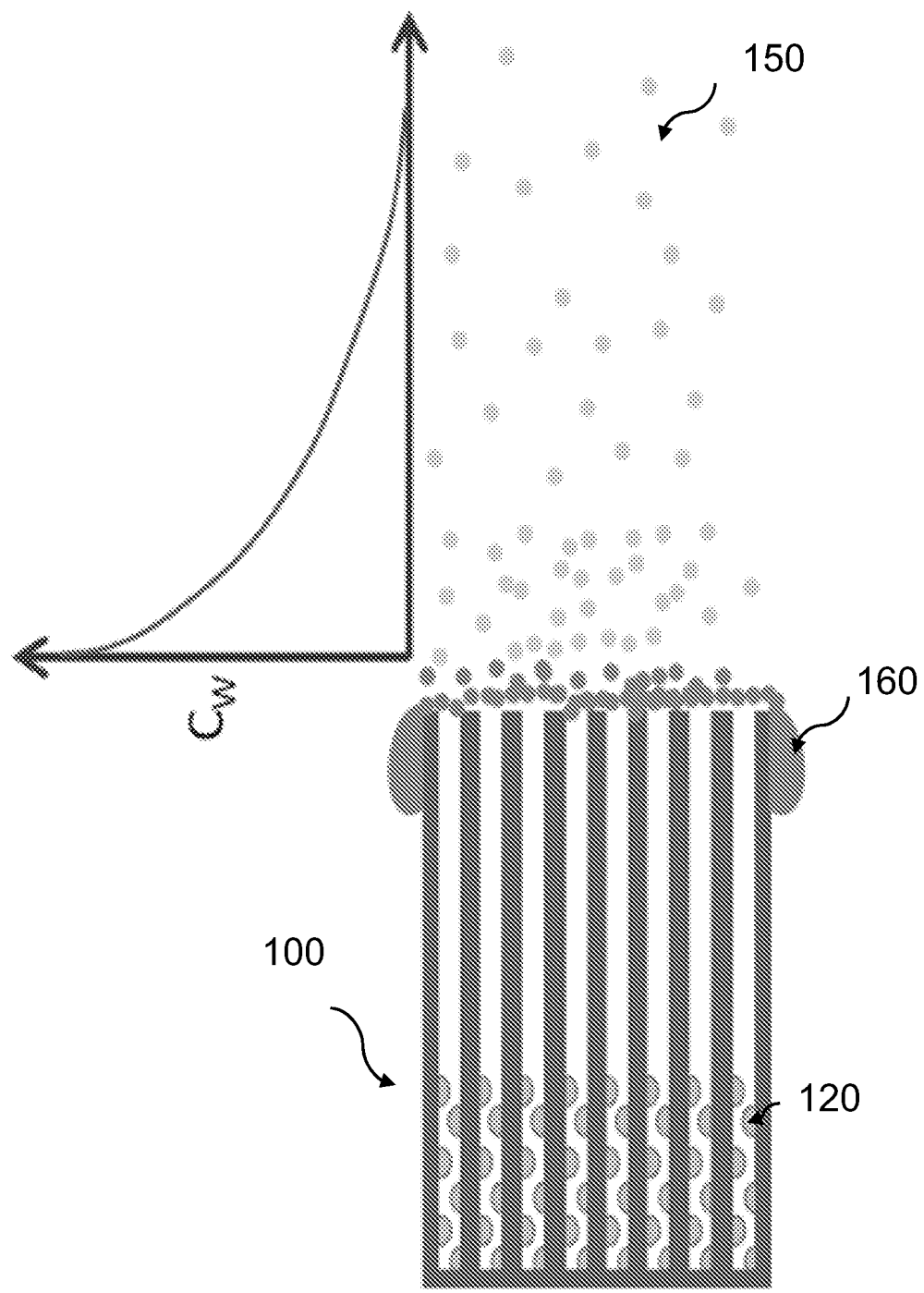
FIGS. 3 and 4 show a schematic drawing of the mechanism for water harvesting according to embodiments of the present disclosure.

Referring now to FIG. 3, FIG. 3 exemplifies the mechanism of moisture removal and/or water harvesting using the materials 100 of the present disclosure in the case of a nano-confinement, which will be discuss later in more detail. The materials 100 may include a low water activity material 120 that attracts the moisture 150 from the air inducing micro-condensation 160 of the water. The liquid water formed may be rapidly wicked away by the hydrophilic material, before the water penetrates the pores and adsorbs on the confined LWA material. In various embodiments, the moisture removal and/or water harvesting occur at a temperature above a dew point temperature. In one or more embodiments, the material for moisture removal and/or water harvesting from air has a harvesting capacity of at least 5 kg/kg/h in air under saturated water vapor condition.

As defined herein, water activity, $a_w$, is defined as the ratio of the partial vapor pressure of water in a substance to the standard-state partial vapor pressure of the water. A low water activity material is a material that has a low $a_w$ compared to the ambient vapor pressure such that the material may adsorb moisture from the air. As defined herein, low water activity materials are materials having high affinity for water, but do not act as phase change materials. According to the present embodiments, the low water activity (LWA) materials may include materials that are conventionally classified as 1) a desiccant or a mixture of desiccants which may be used in water adsorption or absorption; or 2) hygroscopic materials, but may also include other materials that can be classified as 3) materials having a water activity ($a_w$) of less than 0.6. As defined herein, a material with $a_w<0.6$ may be able to remove moisture from air with a relative humidity higher than 60% (for example, air with $a_w>0.6$). LWA materials having $a_w$ of less than 0.6 are defined herein as materials that may exhibit high affinity for water, especially within narrow hydrophilic pores. Such materials that would be considered a low water activity material by virtue of its water activity value that are not conventionally classified as either a desiccant or hygroscopic material may include, but are not limited for example, to titania-containing materials such as ordered mesoporous titania and titania aerogels.

In various embodiments, the LWA desiccant materials may be selected from, but are not limited to the group of copper (II) sulfate, cobalt (II) chloride, potassium carbonate, magnesium sulfate, silica gel, aerogel, $CaCl_2$ and sucrose. In one or more embodiments, the hygroscopic materials used as LWA materials may be selected from the group of inorganic metal salts (such as silver nitrate, silver chloride, gold chloride, copper nitrate, platinum nitrate, palladium nitrate, lead nitrate, cobalt nitrate, zinc chloride, zinc nitrate, zinc sulfate) and metal oxides (such as silver oxide, gold oxide, platinum oxide, palladium oxide, lead oxide, copper oxide, cobalt oxide, zinc oxide, vanadium oxide). In one or more embodiments, the LWA materials having $a_w$ of less than 0.6 may be selected from the group of sodium chloride, sodium sulfate and lithium chloride. However, other desiccants, hygroscopic materials, LWA materials, or mixtures thereof may also be envisioned.

As noted above, the low water activity material may be confined in a hydrophilic material. As defined herein, hydrophilic materials are defined by the geometry of a water droplet on its surface, in particular the contact angle or the angle between the droplet's edge and the surface beneath. If the water spreads, having therefore a contact angle of less than 90°, the surface is considered hydrophilic. In various embodiments, the hydrophilic material may be a superhydrophilic material. As defined herein, a surface may be considered superhydrophilic if a water-droplet has a contact angle less than 10°. Similarly, a superwetting material may be defined to have a contact angle of less than 5°.

The hydrophilic materials that have shown utility in the present disclosure are hydrophilic materials that may form film coatings on various surfaces, or may aggregate to form coatable powders. In various embodiments, the hydrophilic materials may be selected from the group of inorganic oxides that may include, but are not limited to, silica, zirconium dioxide, zinc oxide, zeolites and titanium oxides. In one or more embodiments, the hydrophilic material may be a photoactive material that may include, but is not limited to titanium dioxide (titania), doped titania, silver titanate and zinc oxide. In such an embodiment, the photoactive material may exhibit self-cleaning properties for its resilience against organic contaminants that are prevalent in air. In yet another embodiment, the hydrophilic material may be a ceramic material that may include, but is not limited to tungsten carbide, silicon carbide, titanium carbide, zirconium dioxide and boron nitride. In one or more embodiments, the hydrophilic material may be a composite material that includes more than one material. Such a composite material may be selected from the group of metal oxides/metal, metal oxides/ceramic material, metal oxides/polymer, polymer/metal, polymer/ceramic, or polymer/polymer. It is also envisioned that the hydrophilic material may be a polymer that may include, but is not limited to inorganic polymers (such as polysiloxane, polyphosphazene), organic polymers (such as polypropylene, polystyrene, nylon) and plasma treated polymers (such as polythyophene, polyhexafluoropropylene, polyhexamethylenedisiloxane).

Figure 5:
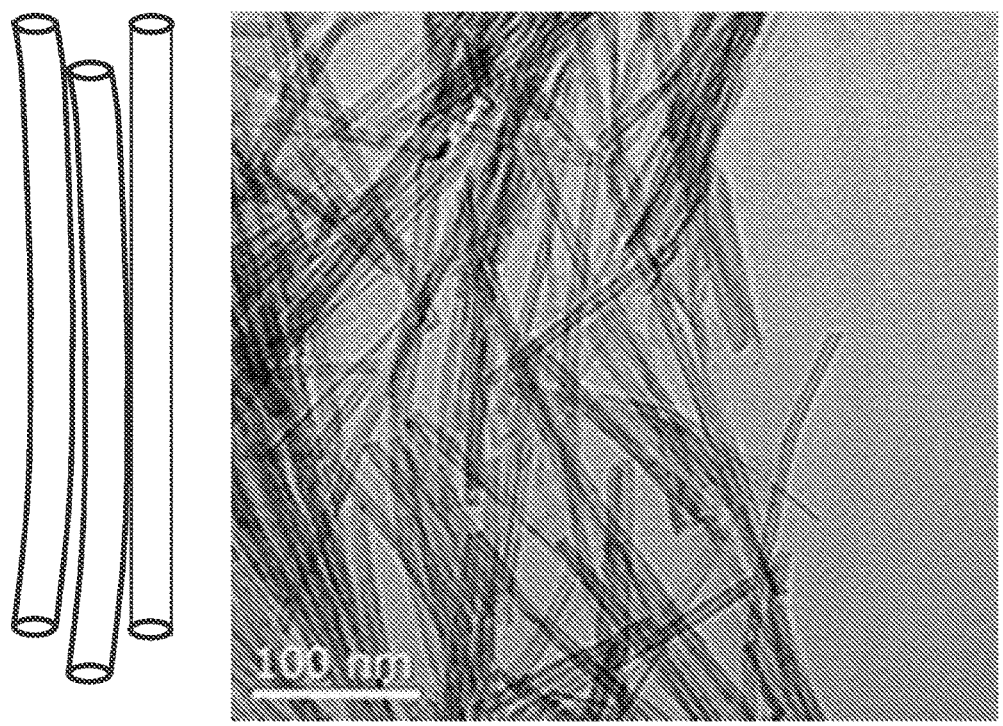
FIG. 5 depicts a high magnification TEM image of a confined low activity water material according to embodiments of the present disclosure.

As noted above, superhydrophilic materials may also be used as hydrophilic materials. In such an embodiment, the superhydrophilic material may include, but is not limited to titania nanotubes (as shown in FIG. 5), titanium dioxide (titania), doped titania, doped titania film and zinc oxide.

In one or more embodiments, the hydrophilic materials may exhibit pores which may be elongated with a length to diameter (L/D) ratio greater than 2. In yet another embodiment, the length to diameter ratio may be greater than 10. The L/D aspect ratio may determine the effective life of the system used for water harvesting. For example, depending on the L/D aspect ratio, a greater proportion of the LWA material may be protected deep within the micropores from water adsorption, thus maintaining a longer effective life. In the case of titanium dioxide (titania) and titania nanotubes (as shown in FIG. 5), the surface is superhydrophilic. Irradiation with light may turn these surfaces into superwetting surfaces, facilitating self-cleaning. These—two materials are also semiconducting and their irradiation may generate electrons and holes that may react and oxidize organic contaminants present on the surface (originating in ambient air), preventing them from altering the hydrophilic properties of the surface.

Figure 4:
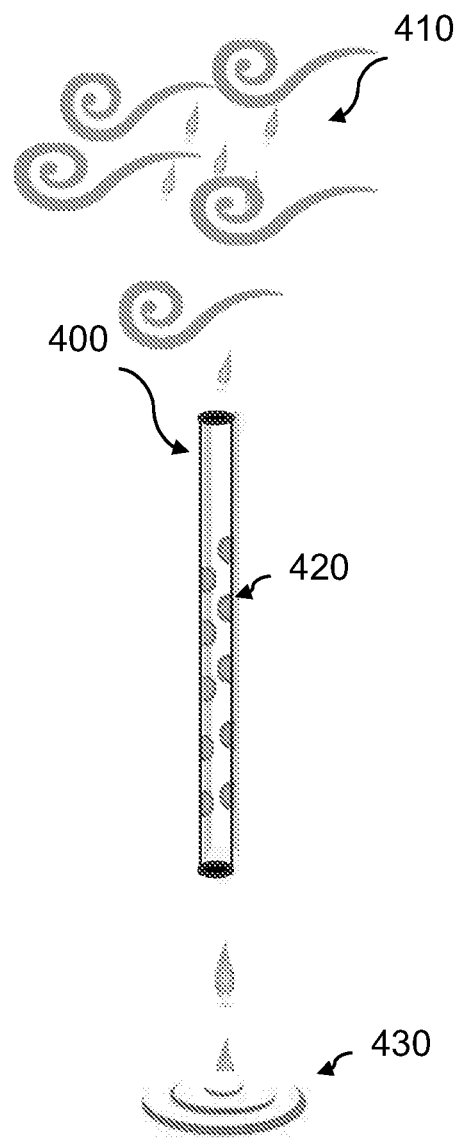

According to the present embodiments, the shape of the hydrophilic material itself may help induce micro-condensation, droplet formation and water drainage. In such embodiments, the shape of the hydrophilic material may be selected in such a manner that the external surface on which the water from air condenses may be maximized. For example, in various embodiments, the hydrophilic material may be used as a powder, a pellet, a surface coating or a film. It is also envisioned that the shape of the particulate material may be tubular, such as nanotubes. In such an embodiment, the size of the nanotubes may determine the step of removal of the water. For example, in the case of tubular titania (as shown in FIG. 4), the moisture 410 attracted to the confined LWA material 420 first adsorbs and afterwards condenses on the external surface of the tubular titania 400. As seen in FIG. 4, the elongated tip of the titania tube 400 allows collection of the water at a single point with the formation of water droplets 430 which can be drained by gravity. In such an embodiment, the shape of the particulate material may allow for a maximized external surface and may direct water to a single point for water droplet formation.

One embodiment of the present disclosure involves a method for moisture removal and/or water harvesting from air. In such an illustrative embodiment, the method involves coating a mesh with a material for moisture removal and/or water harvesting comprising a hydrophilic material containing micropores, and a low water activity material confined within the micropores of the hydrophilic material, and collecting water from the material.

Figure 6:
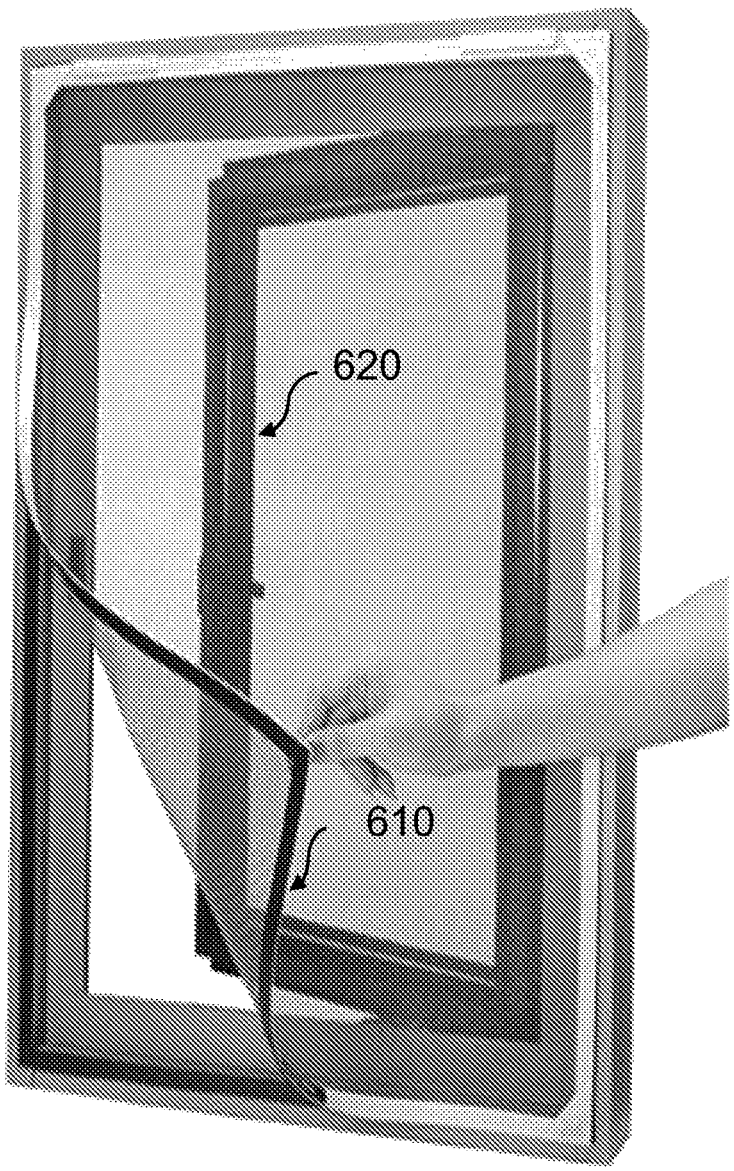
FIG. 6 depicts a conceptual use of the technology as a moisture barrier according to embodiments of the present disclosure.
Figure 7:
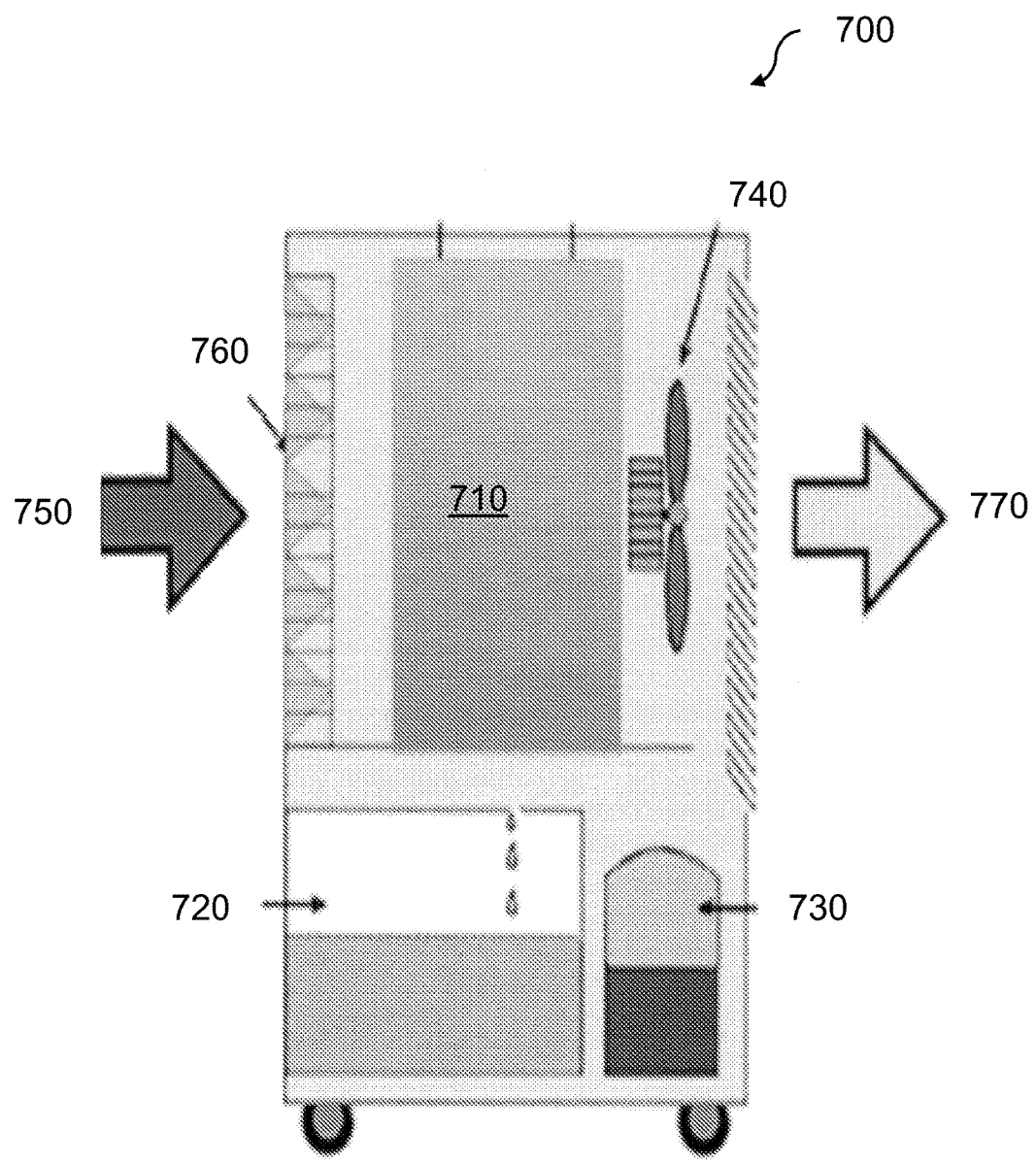
FIG. 7 depicts a conceptual use of the technology for air dehumidification according to embodiments of the present disclosure.

The materials for moisture removal and/or water harvesting disclosed herein may be used in an apparatus that includes a mesh coated with the material for moisture removal and water harvesting and at least a container or a drainage system for collecting water from the material for moisture removal and/or water harvesting. In various embodiments, the apparatus may be used for removal of excess moisture from air. In such embodiments, the apparatus may be a dehumidifier, an air conditioning system, an air cooling system, or an air heating unit for industrial, commercial and domestic use that are based on a compressor-refrigeration cycle. It is also envisioned that the apparatus is a stand alone dehumidifier, or an existing humidifier which may be modified to incorporate the present materials to increase energy efficiency. In such embodiment, the material for moisture removal and water harvesting may be coated on mesh 610 as in the case of moisture barrier for a window 620 as shown in FIG. 6. In yet another embodiment, the material for moisture removal and/or water harvesting disclosed herein may be placed on a substrate 710 inside a dehumidifier 700 that includes a compressor 730. The wet air 750 passes first through an air filter 760, then through the coated substrate 710. The fan 740 moves the dried air through 760, 710 and out to 770, while the liquid water formed is collected in the water tank 720. In such an embodiment, the energy consumption may be reduced. In yet another embodiment, the apparatus may be a controlled humidity storage and oven, a conventional and nonconventional drier, a convective air flow drier, a desiccator unit or similar devices designated to extract excess water moisture from a solid or liquid. In all the above embodiments, the material for moisture removal and/or water harvesting may be used as a powder, a pellet, or may be coated on a mesh or other component to improve or enhance moisture removal from air, gases, solids or liquids.

Figure 8:
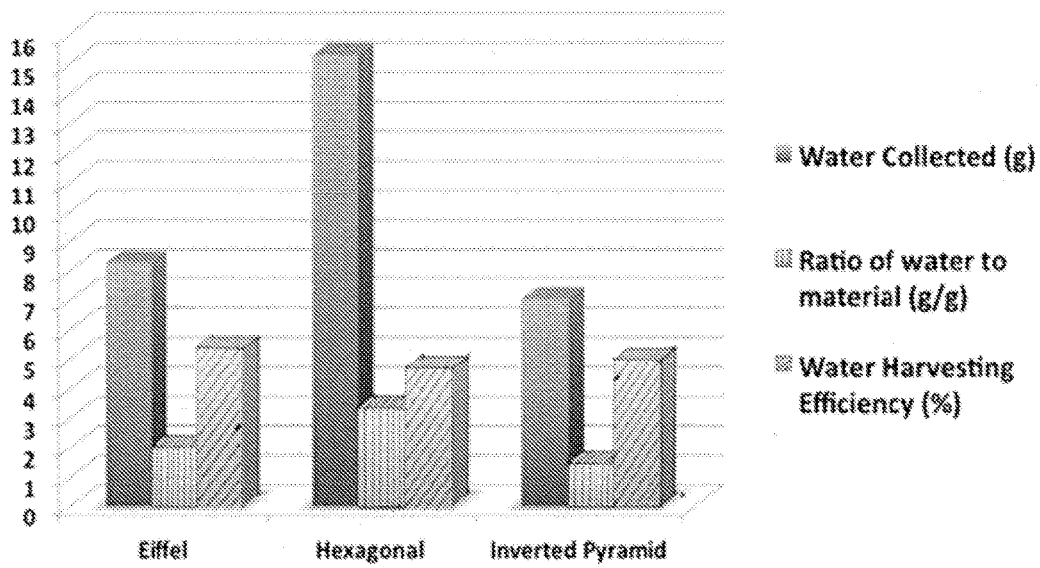
FIG. 8 shows a comparison of the water collection using different water harvesting apparatuses according to the present embodiments.

It is also envisioned that the materials for moisture removal and/or water harvesting of the present disclosure may be used to enhance the performance or regeneration of solid and liquid desiccants used in industrial, commercial and domestic situations. In one or more embodiments, the materials for moisture removal and/or water harvesting of the present disclosure may be used in devices or processes for food-related processing or production for the control of the moisture content in the device or the product. In yet another embodiment, the materials for moisture removal and/or water harvesting of the present disclosure may be used in transport vehicles including automobiles, aircrafts, and ships with the purpose of cooling the engine or the cabin (i.e., desiccant cooling). In one or more embodiments, the materials for moisture removal and/or water harvesting of the present disclosure may be used as a moisture barrier in industrial, commercial, and domestic situations to remove moisture from air or gas entering a given space. It is also envisioned that the materials for moisture removal and/or water harvesting of the present disclosure may be used for water harvesting to capture moisture from ambient air which is afterwards converted into liquid water. In such an embodiment, the materials for moisture removal and/or water harvesting of the present disclosure may be used in an apparatus with different designs. Referring now to FIG. 8, FIG. 8 shows a comparison of water collection from differently designed apparatuses, such as an inverted pyramid type, an Eiffel type or a hexagonal type.

The properties of the LWA materials of this disclosure were determined by using the analytical techniques as described below.

Micro-Raman Spectroscopy

The phase structure and crystallinity of the LWA materials were analyzed using a Renishaw RM series Raman microscope (RM3000) equipped with dual laser sources (Ar, 514.5 nm, 20 mW, and He—Ne, 632.8 nm, 20 mW), notch filter up to 100 $cm^{-1}$.

Transmission Electron Microscope (TEM)

The morphology and the size of the LWA materials prepared as described herein were measured by using a high-resolution transmission electron microscope (JEOL JEM-2010F, Lattice resolution=0.102 nm, Field Emission Gun, accelerating voltage of 200 kV and beam current of 100 $pA·cm^{-2}$) equipped with an energy dispersive X-ray (EDX) detector.

Scanning Electron Microscope (SEM)

The morphology and the size of the LWA materials were measured by using a scanning electron microscope (JEOL JSM-6300F and JSM-6390 equipped with energy dispersive X-ray (EDX) detector.

The following examples are presented to illustrate the preparation and properties of the materials used for moisture removal and/or water harvesting from air and should not be construed to limit the scope of the disclosure, unless otherwise expressly indicated in the appended claims.

EXAMPLES

LWA Desiccant Materials

Low water desiccant (LWA) materials were confined within the narrow pores of superhydrophilic $TiO_2$. These materials are incorporated with known desiccant materials, such as copper (II) sulfate, cobalt (II) chloride, aerogel, sucrose, etc.

The microwave treatment used for the preparation of the LWA materials involves a high-frequency electromagnetic radiation ($2.45 \times 10^9$ Hz) which interacts with $TiO_2$ and NaOH used as a solvent, with high dielectric constant responses to rapid heating. The rapid heating to the target temperature and an extremely rapid rate of crystallization may be achieved in microwave irradiation by localized super heating in the reagent mixture. The $TiO_2$ and NaOH basic suspension were transferred into a Teflon lined autoclave vessel for a batch microwave treatment using a microwave (Milestone ETHOS 1). A volume of 40 mL $TiO_2$ suspension was placed in a Teflon vessel having a total capacity of approximately 90 mL. This microwave treatment may properly control the temperature and the pressure, which are important parameters in producing Ti-nanosheets.

Example 1

Confined copper sulfate desiccant in superhydrophilic titania was prepared using $TiO_2$, NaOH and copper (II) sulfate desiccant. For example, 0.05 g anatase $TiO_2$ was mixed with 8.55 g 10 M NaOH solution followed by stirring for at least two or three hours with the formation of a homogeneous mixture. Afterwards, the suspension was digested under microwave irradiation (MW) at 180° C. for 30 minutes. The digested suspension was centrifuged and washed with 10 mM copper aqueous solution (copper (II) sulfate) until the washing solution reached a pH value of 6~7. Low water activity titania incorporated copper sulfate desiccant material was obtained after a drying step at 65° C. overnight.

Example 2

Figure 9:
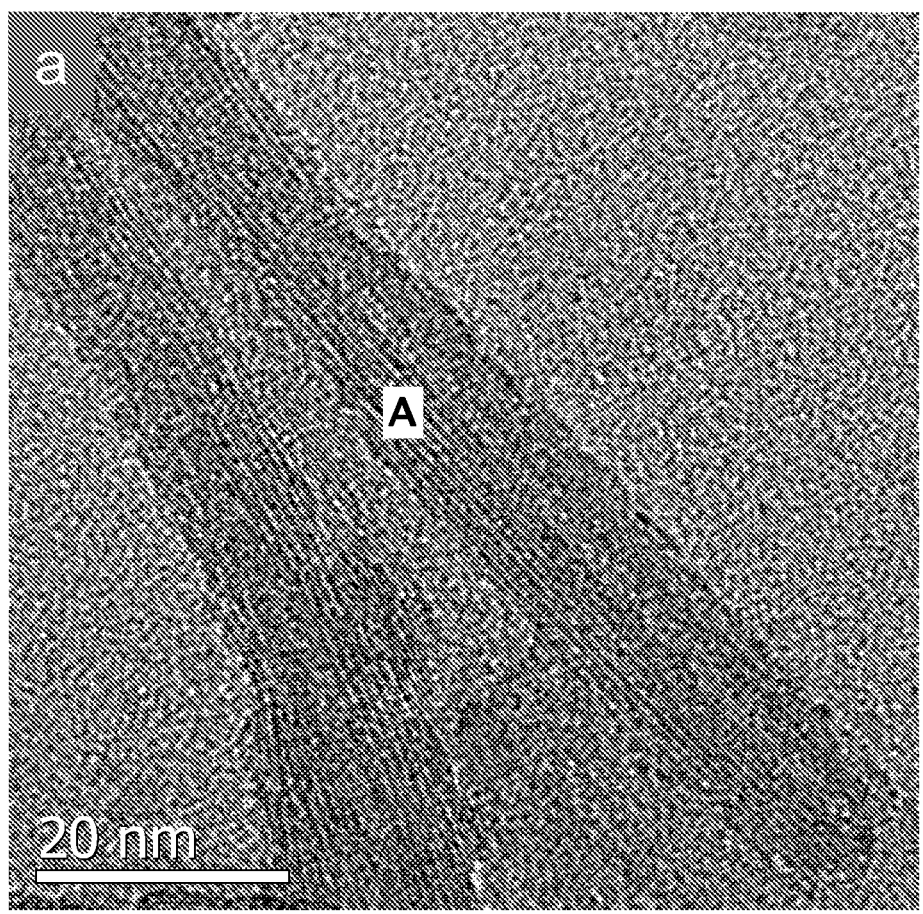
FIG. 9 depicts a TEM image of a confined low activity water material according to embodiments of the present disclosure.
Figure 10:
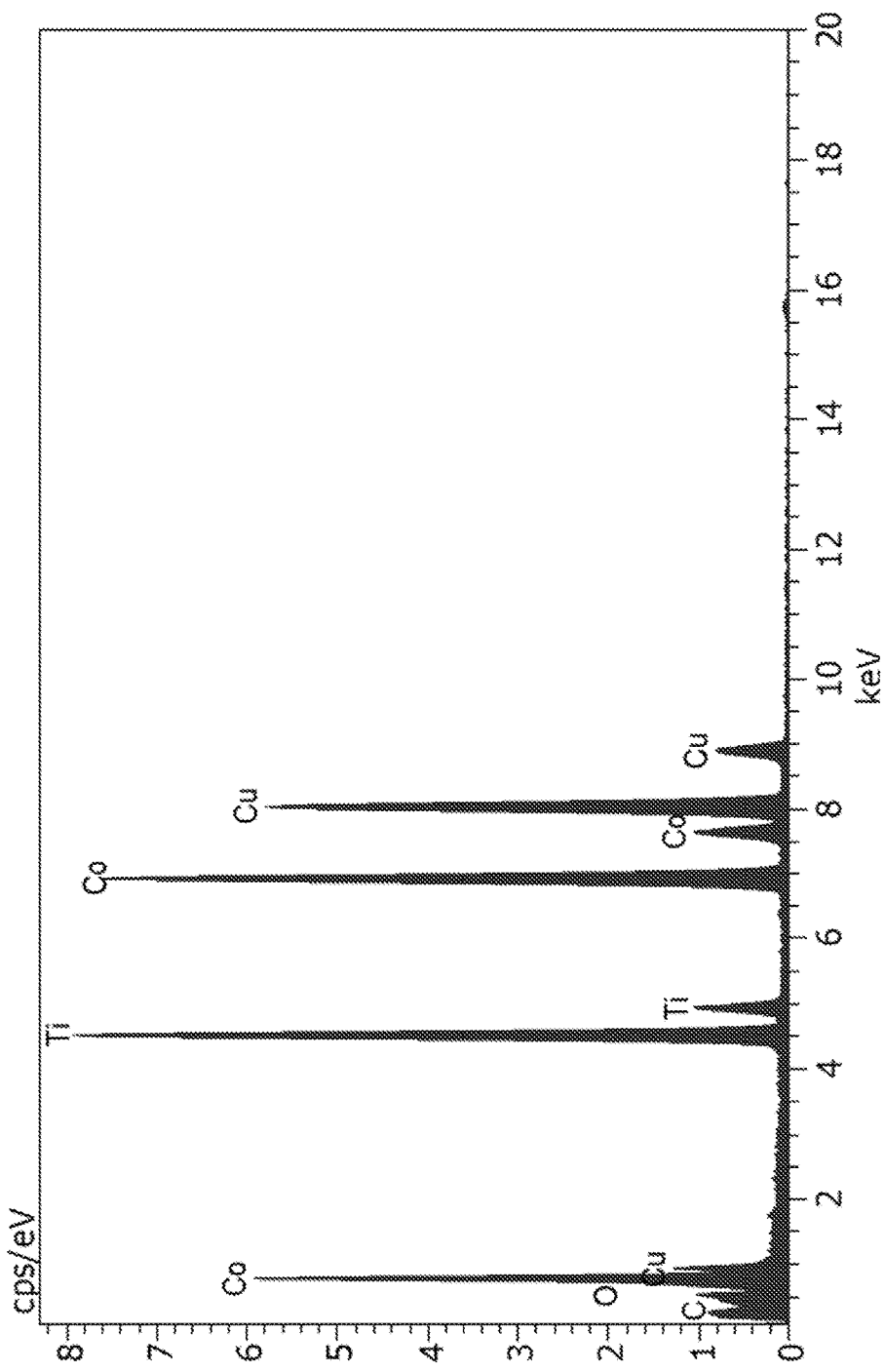
FIG. 10 depicts an Energy-dispersive X-ray (EDX) spectrum of a confined low water activity material according to embodiments of the present disclosure.

Confined cobalt chloride desiccant in superhydrophilic titania was prepared using cobalt (II) chloride and the microwave treated digestion of $TiO_2$ suspension of Example 1. The digested suspension was centrifuged and washed with 10 mM cobalt aqueous solution (cobalt (II) chloride) until the washing solution reached a pH value of 6~7. Low water activity titania incorporated cobalt chloride desiccant material was obtained after a drying step at 65° C. overnight. The TEM image and the EDX spectrum of confined cobalt chloride desiccant in superhydrophilic titania are shown in FIGS. 9 and respectively 10.

Example 3

Self-confining silica desiccant in aerogel was prepared by a sol-gel method. Specifically, 1.3 mL tetramethylorthosilicate (TMOS) was dissolved in 10 mL ethanol. Afterwards, 0.51 g 1 M $NH_4OH$ solution was added to the mixture, followed by a sol-gel method. The alcogel was obtained after a 2 days aging process. A low water activity silica aerogel was obtained by alcohol supercritical drying.

Example 4

Figure 11:
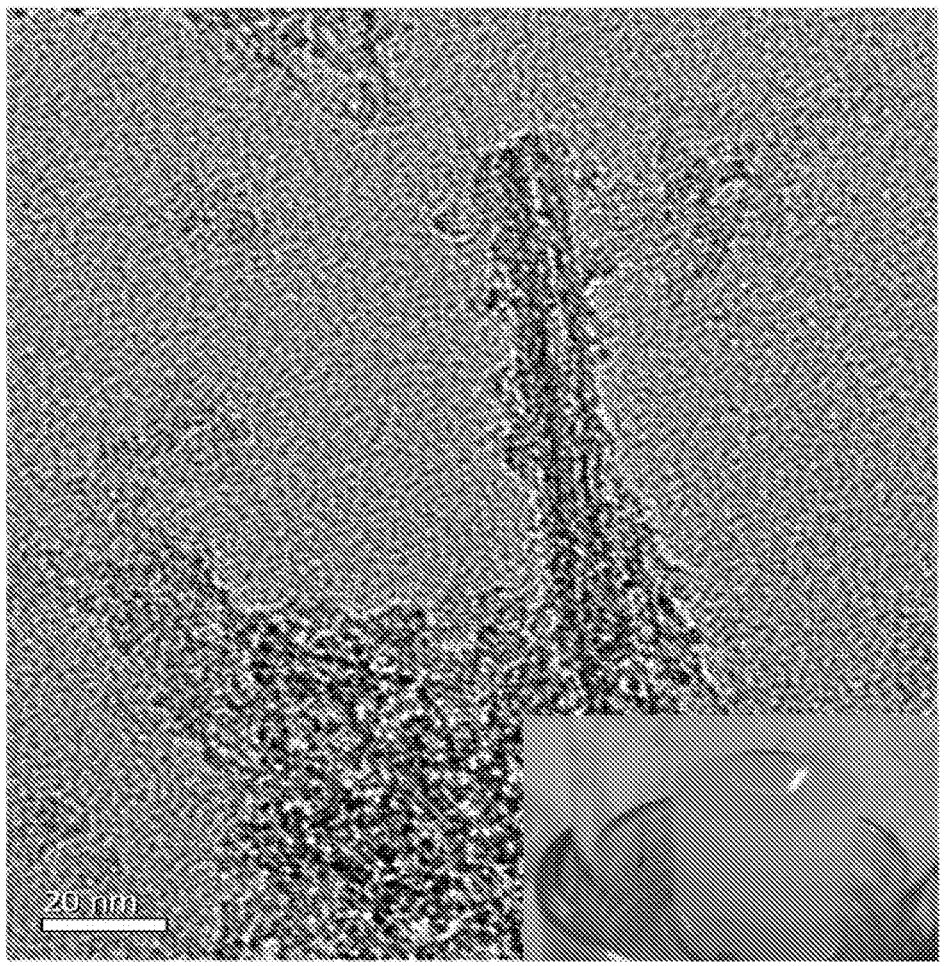
FIGS. 11-13 show high magnification TEM images of confined low activity water materials according to embodiments of the present disclosure.

Confined LWA titania in aerogel was prepared by using the microwave treated digestion of $TiO_2$ suspension of Example 1. The digested suspension was centrifuged and washed with 1.00 g 0.01 M acidic solution. Afterwards, the acidic suspension was mixed with 3.13 g tetraethylorthosilicate (TEOS), followed by stirring at 50° C. for 3 hours. After cooling, the suspension was mixed with 5 mL pure ethanol. Afterwards, the alcogel was obtained by the addition of 0.4 mL 1 M aqueous $NH_3$. Alcohol supercritical drying was performed to obtain titania incorporate aerogel desiccant materials (as shown in FIG. 11).

Example 5

Confined sucrose desiccant in superhydrophilic titania was prepared using titania and sucrose. Specifically, 1 g of $TiO_2$ was mixed with 1.7 mL sucrose aqueous solution. The mass ratio was 1:0.18. The mixture was aged for 1-2 hour at room temperature, followed by drying at 100° C. overnight. The dried powder was heated to 120° C. for 6 hours.

LWA Hygroscopic Materials

Low water activity (LWA) hygroscopic materials were confined within the narrow pores of superhydrophilic titania nanotubes. The inventors of the present disclosure have found one type of pores which is denoted as "interlayer pore". According to various embodiments, the "interlayer pore" has a depth of less than one micro-meter (<1 μm) and a width of less than one nanometer (<1 nm). These materials are incorporated with known hygroscopic materials, such as, inorganic salts of metals (silver, gold, platinum, palladium, copper, zinc etc.) and oxides of these metals.

Inorganic Salts as LWA Hygroscopic Materials

Example 6

Confined hygroscopic silver nitrate salts in superhydrophilic titania nanotubes were prepared using $AgNO_3$ salts, ammonia and the microwave treated digestion of $TiO_2$ suspension of Example 1. Specifically, $AgNO_3$ salts were pretreated with excess aqueous ammonia with the formation of a silver complex, namely di-amine silver hydroxide

Figure 12:
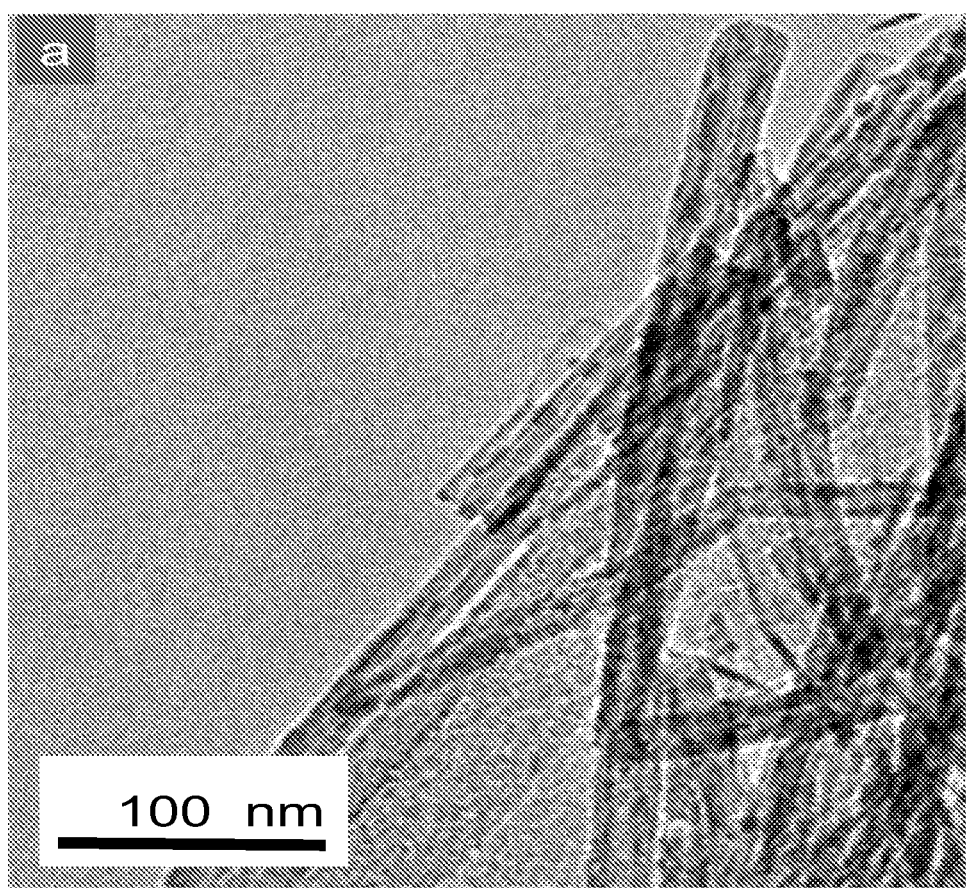
Figure 13:
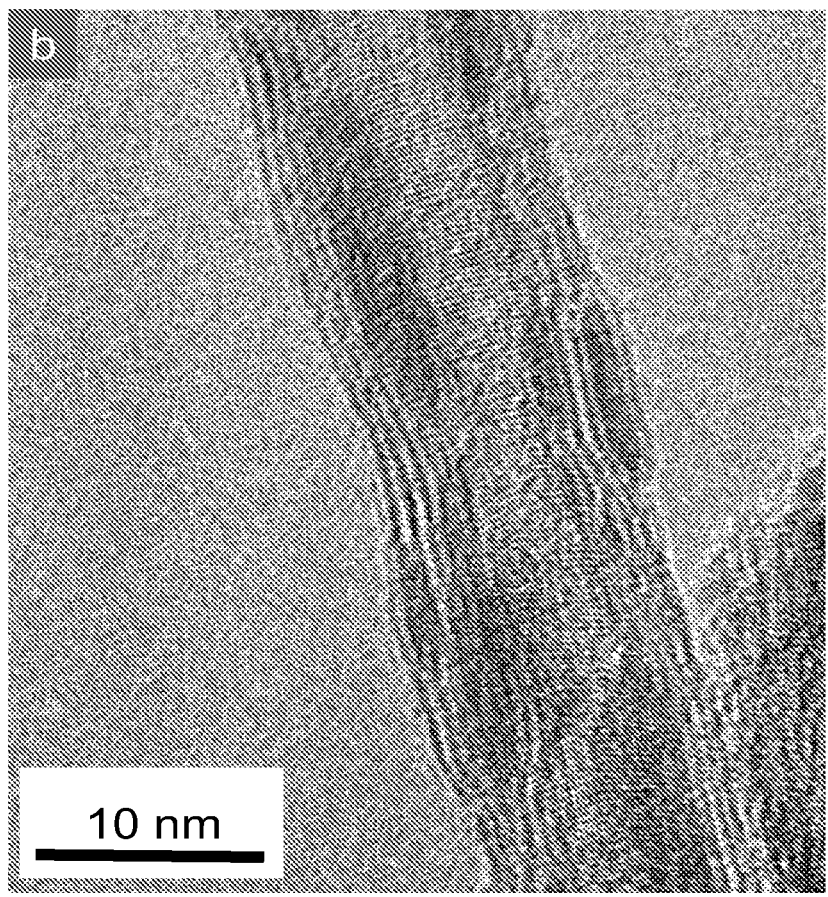
Figure 14:
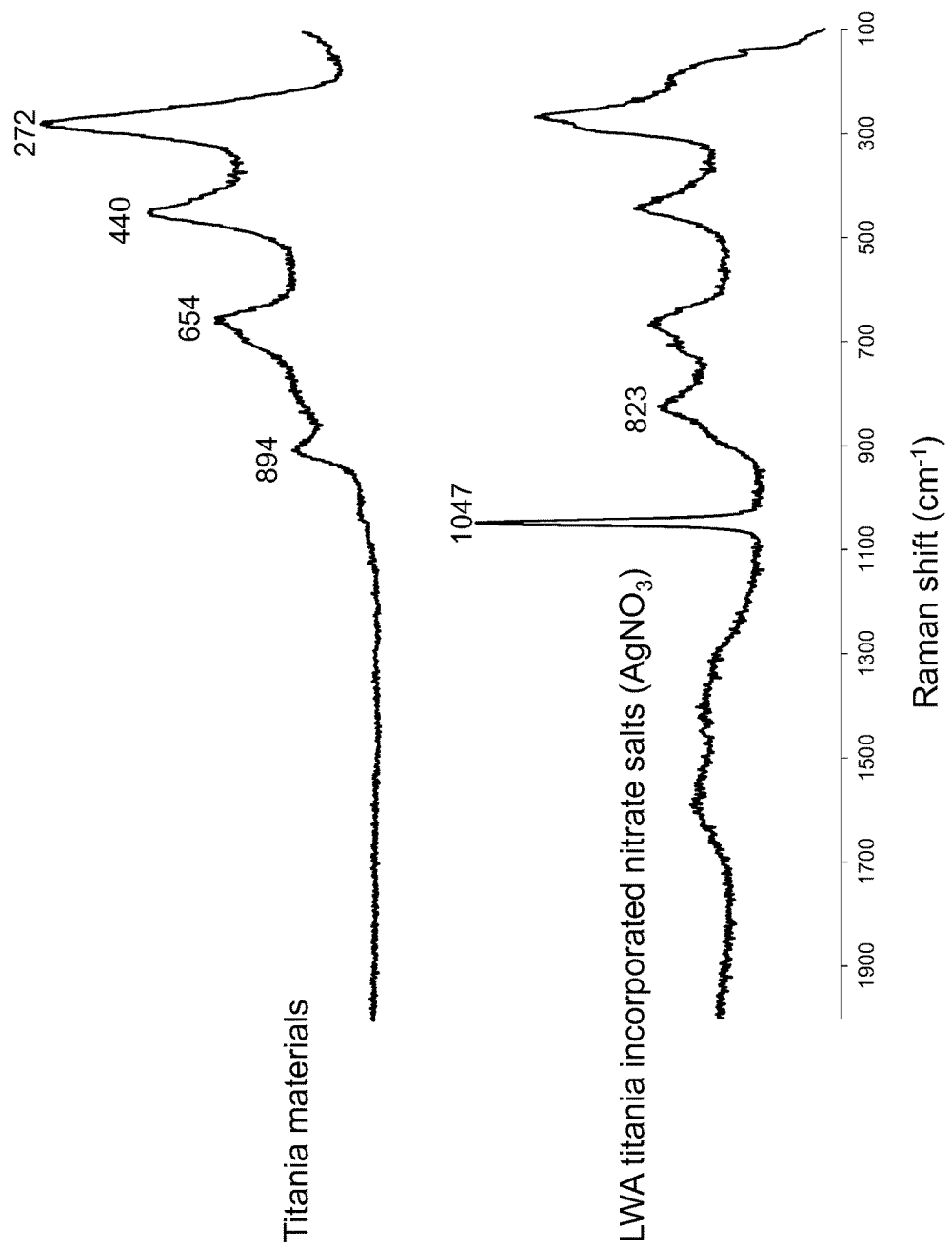
FIG. 14 depicts Raman spectra of a confined low activity water material according to embodiments of the present disclosure.

[Ag(NH$_3$)$_2$](OH). The digested suspension was centrifuged and washed with 10 mM of solution containing the silver complex with the formation of low water activity silver metal salts within the superhydrophillic "interlayer pores". FIGS. 12 and 13 show the TEM images of the low water activity silver salts. The samples were further characterized by Raman spectroscopy and the experimental findings are shown in FIG. 14, indicating the important vibrations observed in the Raman spectrum.

Example 7

Confined hygroscopic gold chloride salts in superhydrophilic titania nanotubes were prepared using gold (III) chloride (HAuCl$_4$.3H$_2$O), ammonia and the microwave treated digestion of TiO$_2$ suspension of Example 1. Specifically, gold (III) chloride (HAuCl$_4$.3H$_2$O) was pretreated with excess aqueous ammonia with the formation of a cationic gold (III) complex, namely tetraammine gold (III) nitrate, [Au(NH$_3$)$_4$](NO$_3$)$_3$]). The digested suspension was centrifuged and washed with 10 mM of gold complex solution with the formation of low water activity gold metal salts within the superhydrophillic "interlayer pores".

Example 8

Confined hygroscopic platinum nitrate salts in superhydrophilic titania were prepared using the microwave treated digestion of TiO$_2$ suspension of Example 1. The digested suspension was centrifuged and washed with 10 mM of platinum aqueous solution, namely tetraammine platinum (II) nitrate (Pt(NH$_3$)$_4$(NO$_3$)$_2$), to obtain low water activity platinum metal salts within the superhydrophillic "interlayer pores".

Example 9

Confined hygroscopic palladium nitrate salts in superhydrophilic titania were prepared using the microwave treated digestion of TiO$_2$ suspension of Example 1. The digested suspension was centrifuged and washed with 10 mM of palladium aqueous solution, namely tetraammine palladium (II) nitrate, (Pd(NH$_3$)$_4$.(NO$_3$)$_2$), with the formation of low water activity palladium metal salts within the superhydrophillic "interlayer pores".

Example 10

Figure 15:
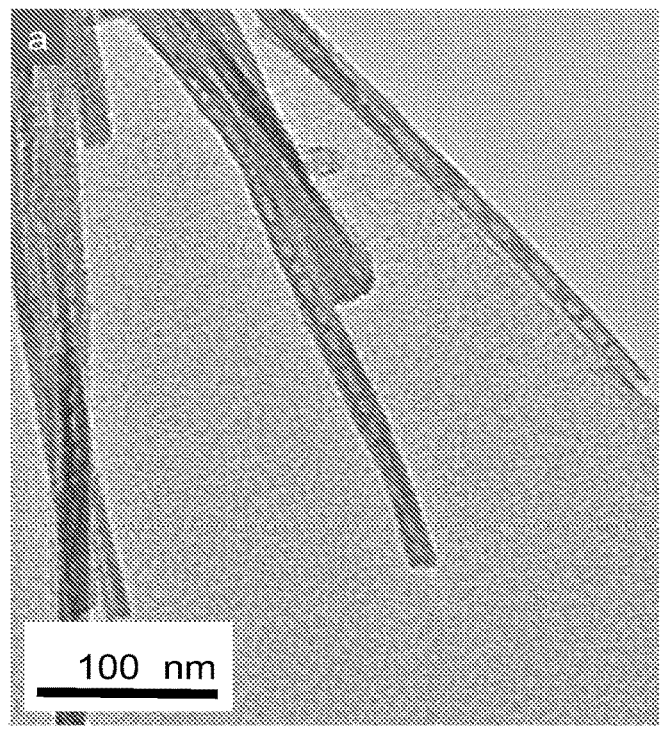
FIG. 15-22 show high magnification TEM images of confined low activity water materials according to embodiments of the present disclosure.
Figure 16:
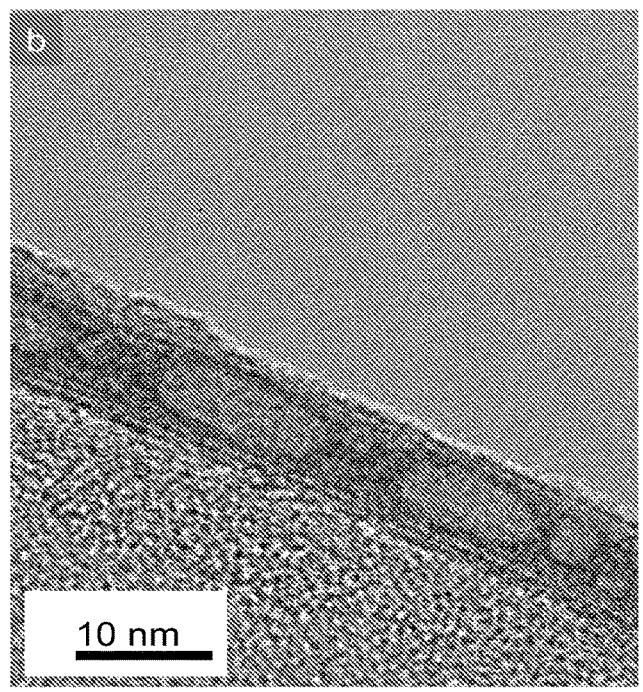

Confined hygroscopic lead nitrate salts in superhydrophilic titania were prepared using lead nitrate, ammonia and the microwave treated digestion of TiO$_2$ suspension of Example 1. Specifically, lead nitrate, Pb(NO$_3$)$_2$, was pretreated with excess aqueous ammonia with the formation of a cationic lead (II) complex, namely tetraammine lead (II) nitrate. The digested suspension was centrifuged and washed with 10 mM of a lead aqueous solution, namely tetraammine lead (II) nitrate, with the formation of low water activity lead metal salts within the superhydrophillic "interlayer pores". FIGS. 15 and 16 show the TEM images of the confined lead salts.

Example 11

Confined hygroscopic copper nitrate salts in superhydrophilic titania was prepared using copper nitrate, ammonia and the microwave treated digestion of TiO$_2$ suspension of Example 1. Specifically, copper nitrate, Cu(NO$_3$)$_2$.3H$_2$O, was pretreated with excess aqueous ammonia to prepare a cationic copper (II) complex, namely tetraammine copper (II) nitrate, [Cu(NH$_3$)$_4$](NO$_3$)$_2$], (TACN). The digested suspension was centrifuged and washed with 10 mM of the copper aqueous solution (TACN) with the formation of low water activity copper metal salts within the superhydrophillic "interlayer pores".

Example 12

Figure 17:
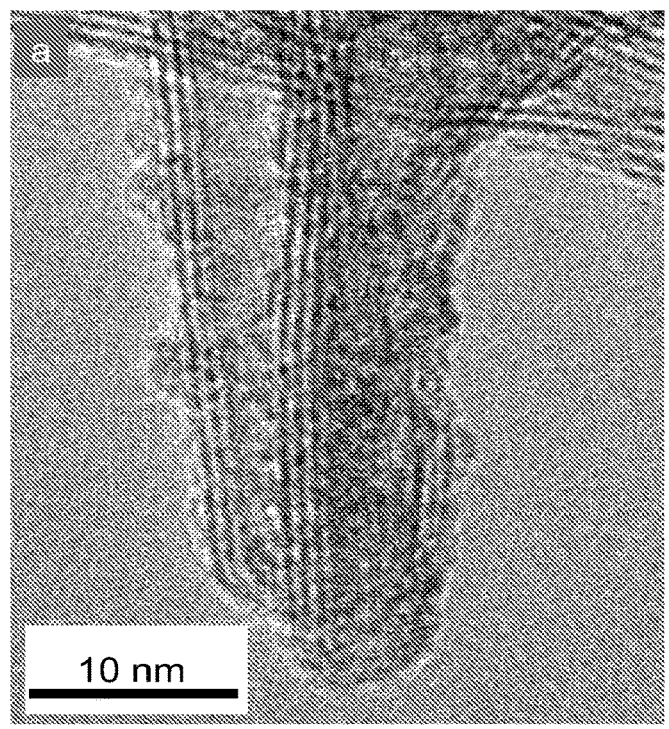
Figure 18:
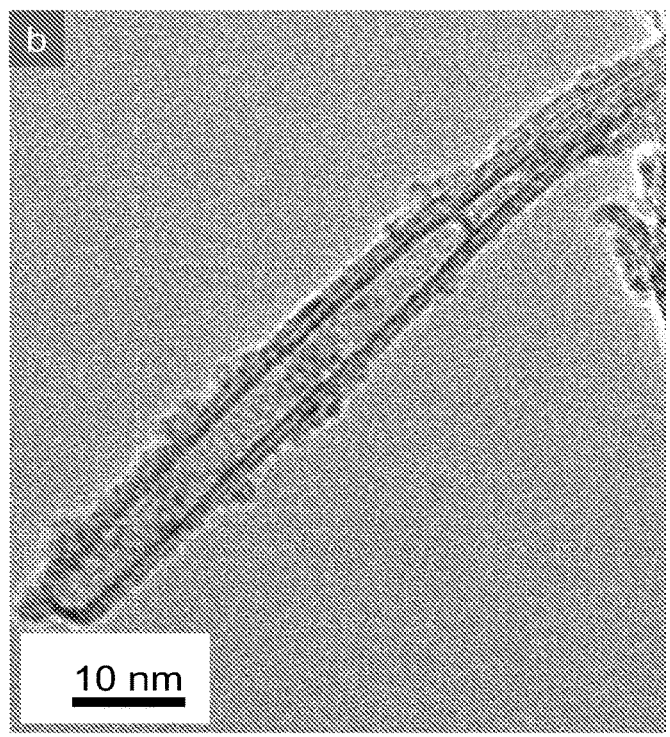

Confined hygroscopic cobalt nitrate salts in superhydrophilic titania were prepared by using cobalt nitrate, ammonia and the microwave treated digestion of TiO$_2$ suspension of Example 1. Specifically, Co(NO$_3$)$_2$.6H$_2$O was pretreated with excess aqueous ammonia to prepare a cationic cobalt complex, namely tetraammine carbonato cobalt (III) nitrate, [Co(NH$_3$)$_4$CO$_3$].(NO$_3$)$_3$. The digested suspension was centrifuged and washed with 10 mM of cobalt aqueous solution (tetraammine carbonato cobalt (III) nitrate) with the formation of low water activity cobalt metal salts within the superhydrophillic "interlayer pores". FIGS. 17 and 18 show the TEM images of the confined cobalt salts.

Example 13

Figure 19:
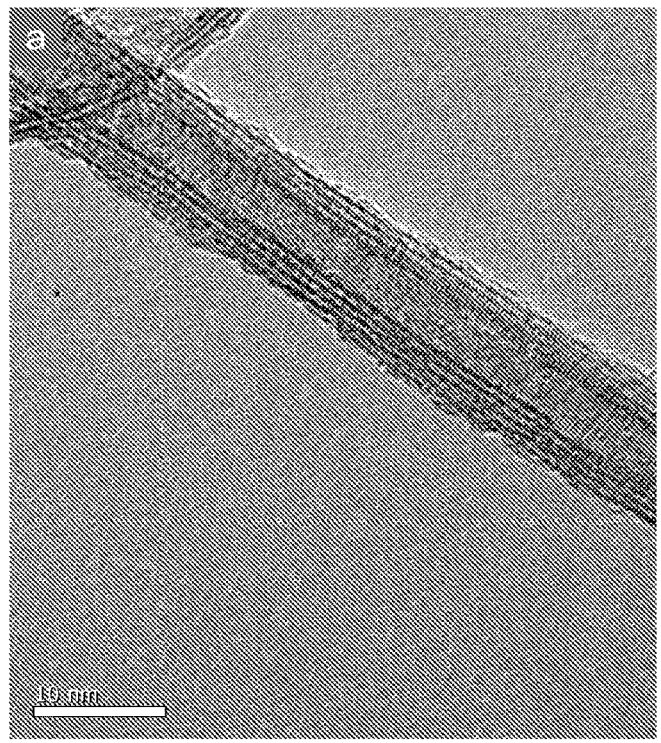
Figure 20:
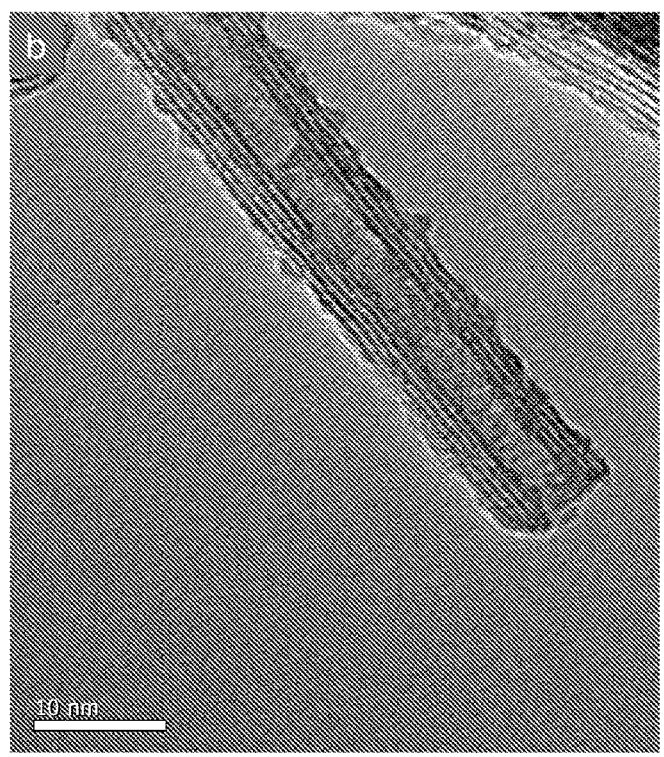

Confined hygroscopic zinc chloride salts in superhydrophilic titania were prepared using zinc chloride, ammonia and the microwave treated digestion of TiO$_2$ suspension of Example 1. Specifically, zinc chloride, ZnCl$_2$, was pretreated with excess aqueous ammonia with the formation of a cationic zinc complex, namely tetraammine zinc (II) chloride, Zn(NH$_3$)$_4$Cl$_2$.H$_2$O. The digested suspension was centrifuged and washed with 10 mM of zinc aqueous solution (tetraammine zinc (II) chloride) with the formation of low water activity zinc metal salts within the superhydrophillic "interlayer pores". FIGS. 19 and 20 show the TEM images of the confined cobalt salts.

Example 14

Confined hygroscopic zinc nitrate/sulfate salts in superhydrophilic titania were prepared using zinc nitrate or zinc sulfate, ammonia and the microwave treated digestion of TiO$_2$ suspension of Example 1. Specifically, zinc nitrate or zinc sulfate was pretreated with excess aqueous ammonia to prepare a cationic zinc complex, namely tetraammine zinc (II) nitrate/sulfate, Zn(NH$_3$)$_4$(NO$_3$)$_2$ or Zn(NH$_3$)$_4$(SO$_4$). The digested suspension was centrifuged and washed with 10 mM of zinc aqueous solution (tetraammine zinc (II) nitrate/sulfate) with the formation of low water activity zinc metal salts within the superhydrophillic "interlayer pores".

Inorganic Salts of Different Metal Oxides as LWA Hygroscopic Materials

Example 15

Confined hygroscopic silver oxide in superhydrophilic titania was prepared using the low water activity silver metal salts of Example 6. The resulted LWA Ag salts were calcined at 300° C. for 3 hours in a tubular furnace with an oxygen flow rate of 10 cm$^3$/min with the formation of low water activity silver oxide metal salts within the superhydrophillic "interlayer pores".

Example 16

Confined hygroscopic gold oxide in superhydrophilic titania was prepared using the low water activity gold metal salts of Example 7. The prepared LWA Au salts were calcined at 300° C. for 3 hours in a tubular furnace with an oxygen flow rate of 10 cm$^3$/min with the formation of low water activity gold oxide metal salts within the superhydrophillic "interlayer pores".

Example 17

Confined hygroscopic platinum oxide in superhydrophilic titania was prepared using the low water activity platinum metal salts of Example 8. The prepared LWA Pt salts were calcined at 300° C. for 3 hours in a tubular furnace with an oxygen flow rate of 10 cm$^3$/min with the formation of low water activity platinum (IV) oxide metal salts within the superhydrophillic "interlayer pores".

Example 18

Figure 21:
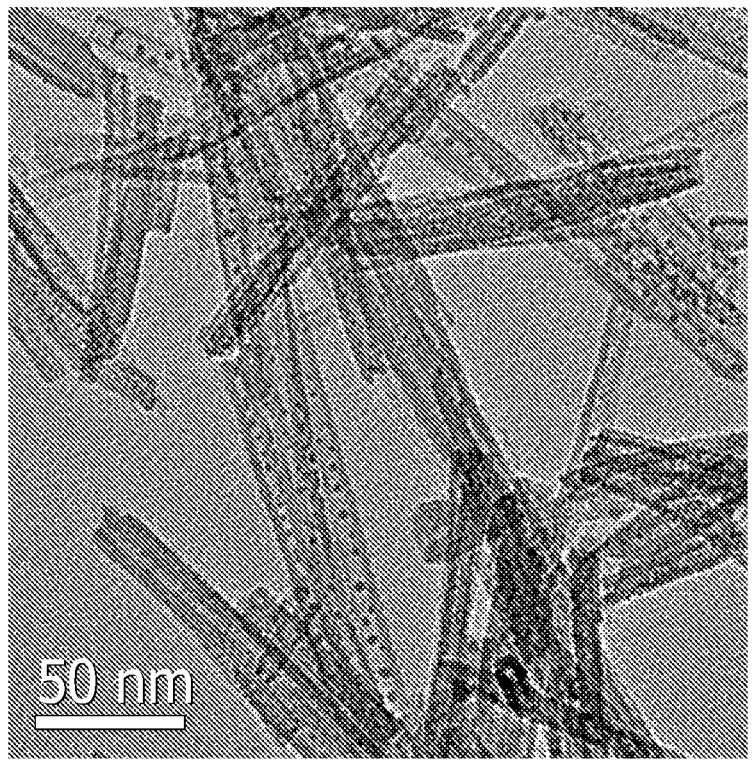

Confined hygroscopic palladium oxide in superhydrophilic titania was prepared using the low water activity palladium metal salts of Example 9. The prepared LWA Pd salt was calcined at 300° C. for 3 hours in a tubular furnace with an oxygen flow rate of 10 cm$^3$/min with the formation of low water activity palladium (II) oxide metal salts within the superhydrophillic "internal lumen pore". FIG. 21 shows the TEM image of the confined Pd salts.

Example 19

Confined hygroscopic lead oxide in superhydrophilic titania was prepared using the low water activity lead metal salts of Example 10. The prepared LWA Pb salts were calcined at 300° C. for 3 hours in a tubular furnace with oxygen flow rate of 10 cm$^3$/min with the formation of low water activity lead (II, IV) oxide metal salts within the superhydrophillic "interlayer pores".

Example 20

Confined hygroscopic copper oxide in superhydrophilic titania was prepared using the low water activity copper metal salts of Example 11. The prepared LWA Cu salts were calcined at 300° C. for 3 hours in a tubular furnace with an oxygen flow rate of 10 cm$^3$/min with the formation of low water activity copper (II) oxide metal salts within the superhydrophillic "interlayer pores".

Example 21

Confined hygroscopic cobalt oxide in superhydrophilic titania was prepared by using the low water activity cobalt metal salts of Example 12. The prepared LWA Co-salts were calcined at 300° C. for 3 hours in a tubular furnace with oxygen flow rate of 10 cm$^3$/min with the formation of low water activity cobalt (II, III) oxide metal salts within the superhydrophillic "interlayer pores".

Example 22

Confined zinc oxide in superhydrophilic titania was prepared by using the low water activity zinc metal salts of Example 13. The prepared LWA Zn salts are calcined at 300° C. for 3 hours in a tubular furnace with an oxygen flow rate of 10 cm$^3$/min to prepare low water activity zinc oxide metal salts within the superhydrophillic 'interlayer pores'.

Example 23

Confined hygroscopic vanadium oxide in superhydrophilic titania was prepared by first dissolving TMOS in 10 mL ethanol. Next, 15% vanadium and titanium catalyst (V/Ti weight ratio is 15%) is added to the TMOS suspension by a sol-gel method, followed by the addition of 0.1 M aqueous ammonia. The prepared suspension was aged for 2 days with the formation of an alcogel. Afterwards, a 15-15 VT aerogel was prepared by alcohol supercritical drying.

Special Examples of LWA Desiccant Materials

Example 24

Figure 22:
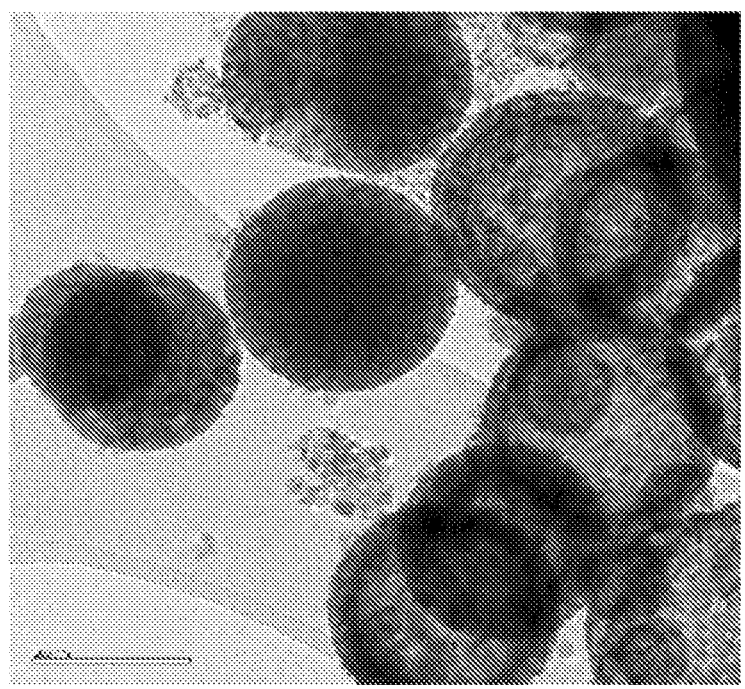

Self-confining ordered mesoporous titania was prepared by using the microwave treated digestion of TiO$_2$ suspension of Example 1. The digested suspension was centrifuged and washed with double deionized water (DDI), followed by drying at 65° C. overnight. The sample was further treated with 100 mL titanium tetrachloride (TiCl$_4$), followed by heating at 70° C. for 30 minutes. Afterwards, low water activity ordered mesoporous titania was prepared by calcinating the mixture at 450° C. for 30 minutes. FIG. 22 shows the TEM images of hollow spheres of mesoporous titania.

Example 25

Figure 23:
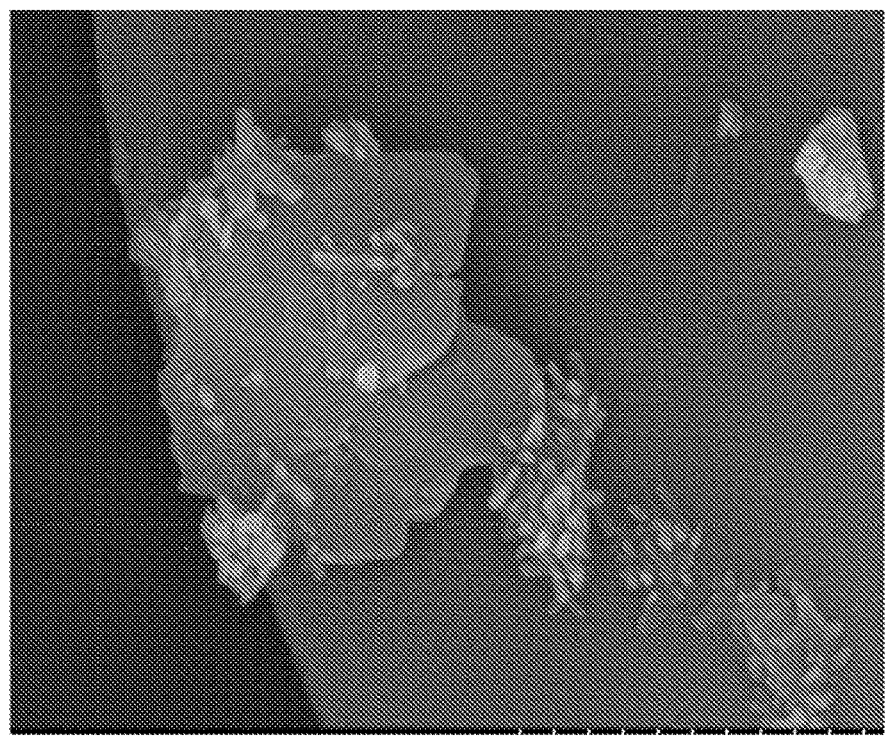
FIG. 23 depicts a Scanning Electron Microscopy (SEM) image of a confined low activity water material according to embodiments of the present disclosure.

Confined LWA titania in activated alumina was prepared by using the microwave treated digestion of TiO$_2$ suspension of Example 1. The digested suspension was centrifuged and washed with double deionized water (DDI), followed by drying at 65° C. overnight. Next, the sample was further treated with alumina (percentage ratio is 1:99), then with 1% cobalt oxide with the formation of the low water activity titania incorporated activated alumina desiccant material. The morphology of the sample was analyzed through SEM, as shown in FIG. 23.

Example 26

A plastic mesh of a LWA material prepared as described herein, having a surface of 0.025 m$^2$, was attached with two 5 inch long stainless steel columns. A glass dish was placed under and between the two columns to collect the harvested water. A humidity meter with thermometer was used to measure in real time the humidity and the temperature. For air circulation a fan was used in front of the setup. The LWA material was coated on the 0.015 m$^2$ mesh area. Harvested water was collected over a period of time. The humidity and the temperature were checked daily to ensure stable humidity. The collected water was preserved in a centrifuge tube. The pH of the harvested water was measured. The quality of the harvested water was performed. The stability of the LWA used for harvesting water was analyzed.

Figure 24:
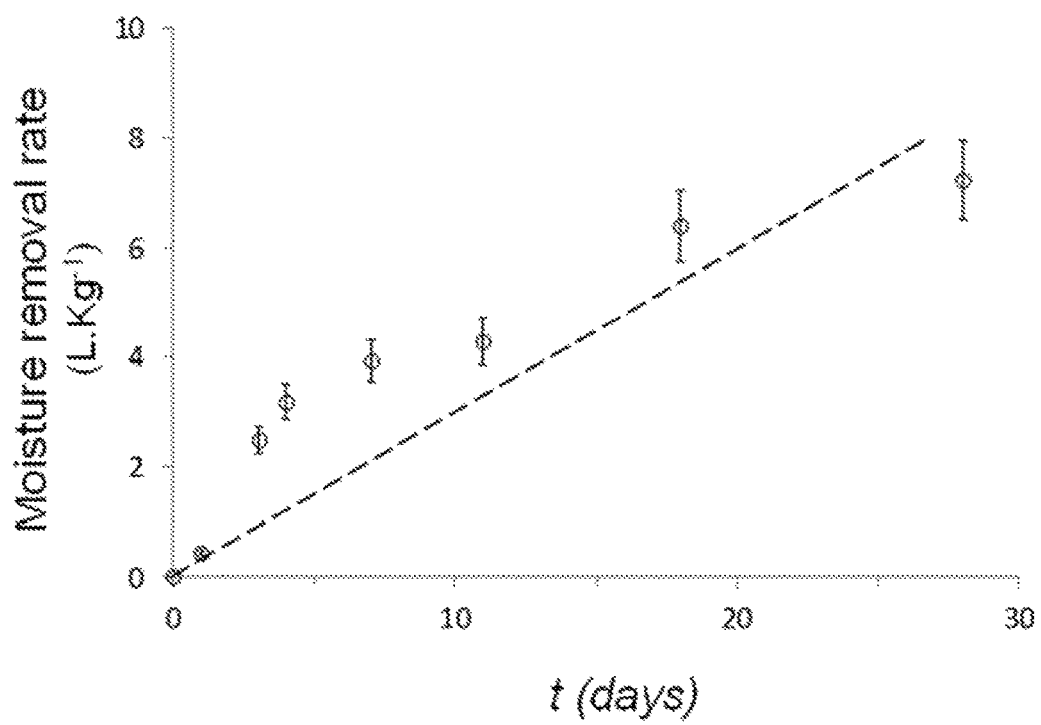
FIGS. 24-25 show the rate of passive moisture removal from air according to embodiments of the present disclosure.
Figure 25:
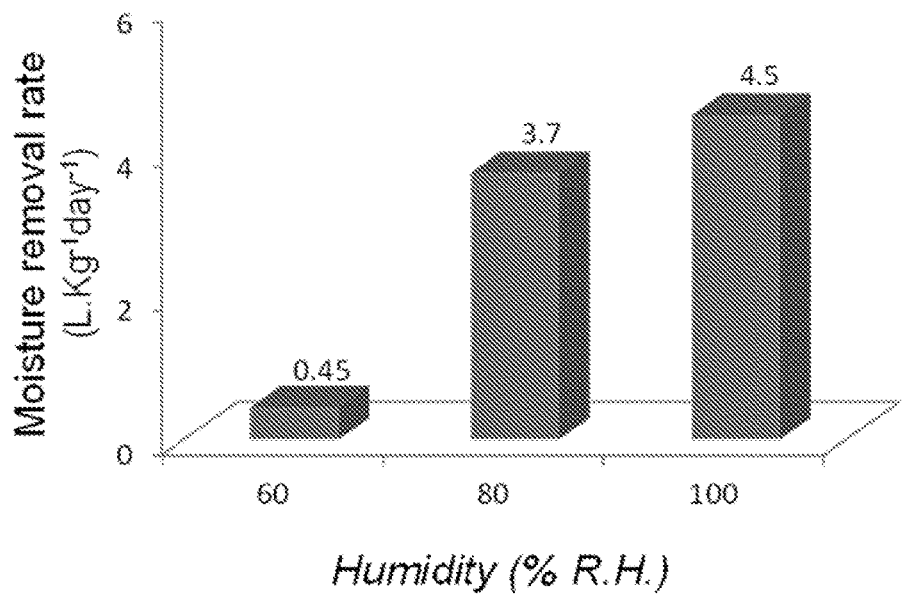
Figure 26:
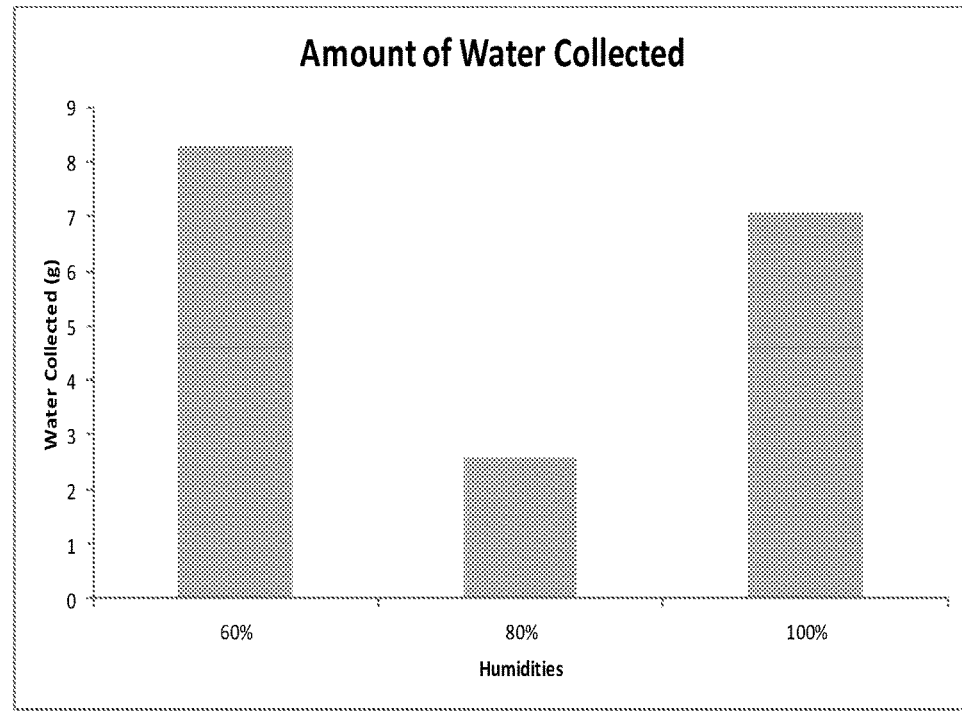
FIG. 26 depicts the amount of water collected according to embodiments of the present disclosure.

To assess the performance of the materials for moisture removal and/or water harvesting of the present disclosure, the rate of the passive moisture removal from air by the material was measured at room temperature (24-25° C.) and a relative humidity of 60±5% over a period of 30 days without regeneration and zero energy usage. The rate of the passive moisture removal was also measured at a temperature of 23-27° C. and relative humidity levels of 60, 80, and 100% over 30 to 120 days test period. The experimental data is presented in FIGS. 24 and 25. According to the experimental data, the moisture removal is passive, and therefore, does not require heating or cooling when used for a stand-alone dehumidifier. In addition, the clean, low carbon technology requires a minimal electricity use (fan). Thus, the use of such materials in existing dehumidifiers and/or AC systems increases energy efficiency and reduces the carbon footprint. Referring now to FIG. 26, FIG. 26 shows a plot of the rate of passive moisture removal from air by a material optimized for operation at room temperature (24-25° C.) and relative humidity of 60±5%. The experimental data shown in FIG. 26, supports the passive and sustained water harvesting at low relative humidity (R.H.). This may allow for built-in humidity control and flexibility of the system.

Figure 27:
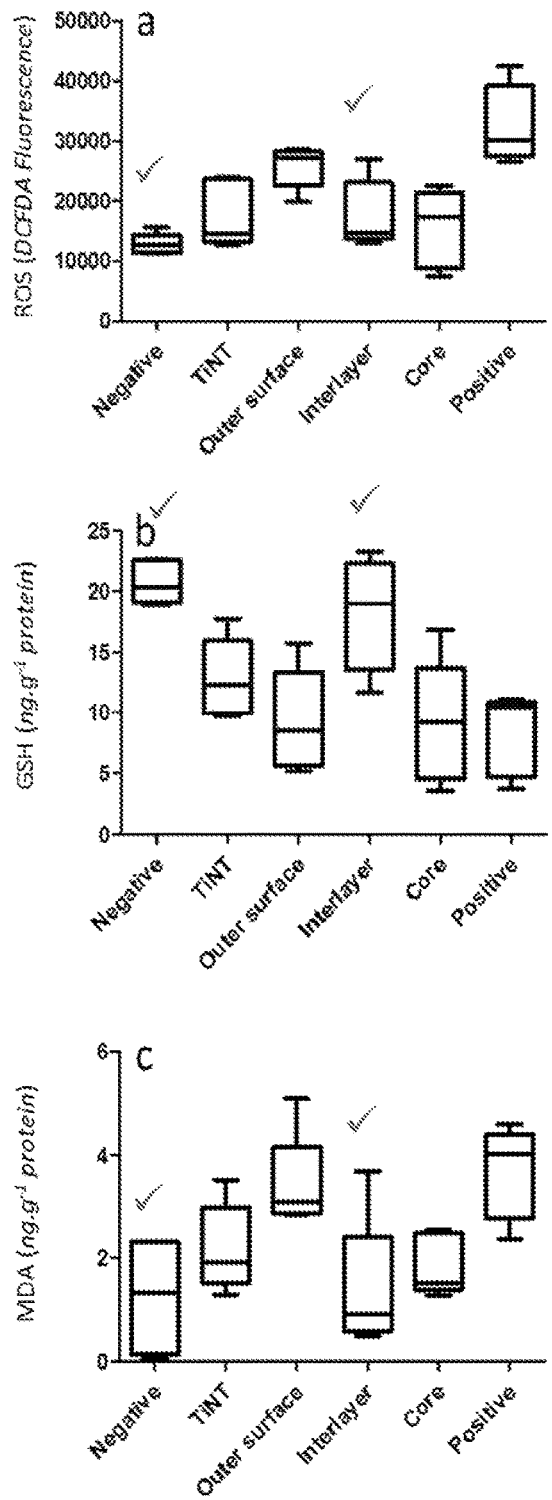
FIG. 27 shows the experimental data with regard the toxicity of the samples.

To further access the properties of the samples, the toxicity of the materials for moisture removal and/or water harvesting of the present disclosure was tested on mice. As seen in FIG. 27, the samples are safe and non-toxic.

Advantageously, embodiments of the present disclosure provide materials for moisture removal and/or water harvesting from air that include low water activity materials which are confined within narrow pores of hydrophilic materials. The moisture removal and/or water harvesting is passive and does not require heating or cooling. Thus, the materials for moisture removal and/or water harvesting of the present disclosure may advantageously increase energy efficiency. In addition, the materials for moisture removal and/or water harvesting of the present disclosure are non-toxic and are easy to maintain, as they require a simple regeneration step by washing with a salt solution once per year. Their disposal does not raise any health or environmental issues as they are converted to non-toxic materials upon treatment with an acid.

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A material for moisture removal and/or water harvesting from air, comprising:
   a hydrophilic material containing micropores, wherein the hydrophilic material is selected from the group consisting of silica, zirconium dioxide, zinc oxide, titanium oxides, doped titania, silver titanate, ceramic materials, inorganic polymers, organic polymers and plasma treated polymers; and
   a low water activity material confined within the micropores of the hydrophilic material,
   wherein the micropores of the hydrophilic material have a L/D aspect ratio greater than 2.

2. The material of claim 1, wherein the ceramic materials are selected from the group of tungsten carbide, silicon carbide, titanium carbide and boron nitride.

3. The material of claim 1, wherein the hydrophilic material is further a composite selected from the group of metal oxides/metal, metal oxides/ceramic, metal oxides/polymer, polymer/metal, polymer/ceramic, polymer/polymer.

4. The material of claim 1, wherein the hydrophilic material is in the shape of a powder, a pellet, a surface coating, a film, or nanotubes.

5. The material of claim 1, wherein the hydrophilic material exhibits self-cleaning properties.

6. The material of claim 1, wherein the hydrophilic material is a superhydrophilic material.

7. The material of claim 1, wherein the low water activity material is selected from the group of desiccants, hygroscopic materials and materials having water activity $a_w$ of less than 0.6.

8. The material of claim 7, wherein the low water activity material having the water activity $a_w$ of less than 0.6 is selected from the group of sodium chloride, sodium sulfate and lithium chloride.

9. The material of claim 1, wherein the low water activity material is confined within the micropores of the hydrophilic material by liquid deposition, vapor deposition, solid phase reaction, impregnation, ion-exchange, covalent bonding, electrostatic immobilization, sol-gel method, reactive deposition or incorporation.

10. The material of claim 1, wherein the material for moisture removal and/or water harvesting from air has a harvesting capacity of at least 5 kg/kg/h in air under saturated water vapor condition.

11. An apparatus, comprising:
    the material of claim 1; and
    at least a container or a drainage system for collecting water from the material.

12. The apparatus of claim 11, further comprising a mesh coated with the material for moisture removal and water harvesting.

13. A method for moisture removal and/or water harvesting from air, comprising:
    providing a material for moisture removal and/or water harvesting from air comprising:
        a hydrophilic material containing micropores, wherein the hydrophilic material is selected from the group consisting of silica, zirconium dioxide, zinc oxide, titanium oxides, doped titania, silver titanate, ceramic materials, inorganic polymers, organic polymers and plasma treated polymers; and
        a low water activity material confined within the micropores of the hydrophilic material, wherein the micropores of the hydrophilic material have a L/D aspect ratio greater than 2; and
    collecting water from the material.

14. The method of claim 13, wherein the material for moisture removal and/or water harvesting produces liquid water by promoting vapor condensation, droplet formation and water flow.

15. The method of claim 14, wherein the liquid water is wicked away by the hydrophilic material before the liquid water penetrates the micropores of the hydrophilic material.

16. The method of claim 13, wherein the moisture removal and/or water harvesting occur at a temperature above a dew point temperature.

17. The method of claim 13, wherein the hydrophilic material is further selected from the group of composite materials.

18. The method of claim 13, wherein the low water activity material is selected from the group of desiccants, hygroscopic materials and materials having water activity $a_w$ of less than 0.6.

19. The material of claim 1, wherein the material for moisture removal and/or water harvesting produces liquid water by promoting vapor condensation, droplet formation and water flow.

20. The material of claim 19, wherein the liquid water is wicked away by the hydrophilic material before the liquid water penetrates its micropores.

* * * * *